United States Patent Office 3,557,150
Patented Jan. 19, 1971

3,557,150
BENZOPYRANYL CARBAMATES
Paul Edward Drummond, Middleport, and Paul Herman Schroeder, Medina, N.Y., assignors to FMC Corporation, New York, N.Y., a corporation of Delaware
No Drawing. Filed Oct. 30, 1968, Ser. No. 771,991
Int. Cl. C07d 7/20
U.S. Cl. 260—345.2                     3 Claims

ABSTRACT OF THE DISCLOSURE

Novel nematocidal N-substituted 3,4-dihydro-2H-1-benzopyranyl-8 carbamates are described, together with their preparation, physical properties, formulation, and use as nematocides and as nematode ovicides.

BACKGROUND OF THE INVENTION

Useful and effective nematocides must have both a high order of nematocidal activity and a low toxicity to plants and crops. It is also desirable to control nematode ova, as well as the nematodes themselves. There is a continuing need for chemical toxicants with this combination of properties.

In copending application Ser. No. 556,259, filed June 9, 1966, now U.S. Pat. No. 3,468,913, of common ownership herewith, there are described new insecticidal and nematocidal benzopyranyl carbamates. We have discovered that modification of certain of the carbamates, by substitution with N-hydroxy or N-chloroacetyl groups, produces greatly enhanced nematocidal effectiveness, including the control of nematode ova. Such a result is rarely achieved with commercially available nematocides.

SUMMARY OF THE INVENTION

The novel nematocidal compounds of this invention have the general formula:

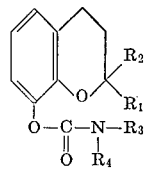

wherein $R_1$ and $R_2$ may each be hydrogen or methyl, $R_3$ is —OH or —COCH$_2$Cl, and $R_4$ is a lower alkyl group.

DESCRIPTION OF THE PREFERRED EMBODIMENTS

The preparation and nematocidal properties of typical compounds of this invention are illustrated in the following specific examples, which are provided only by way of illustration and not of limitation. All temperatures are in degrees centigrade.

Example 1

3,4 - dihydro - 2,2 - dimethyl - 2H - 1 - benzopyranyl - 8 (hydroxy)(methyl)carbamate was prepared as follows: to 25 g. of 3,4-dihydro-8-hydroxy-2,2-dimethyl-2H-1-benzopyran [prepared as described by Hallet and Huls, Bull. Soc. Chim. Belg. 61, 33–43 (1952); C.A. 47, 9966g (1953)] in 100 ml. of benzene at 4° was added 11 ml. of phosgene. To this mixture 14.2 g. of triethylamine was added dropwise with stirring, maintaining the temperature of the reaction mixture at 5–8°. The reaction mixture was allowed to warm to room temperature and stirred for about 18 hours. The mixture was washed with three 80-ml. volumes of cold water, dried over anhydrous magnesium sulfate, filtered and evaporated in vacuo. The residual oil, 3,4-dihydro-2,2-dimethyl-2H-1-benzopyranyl-8 chloroformate, was used directly for synthesis of the carbamate, as follows: To 11.7 g. of N-methylhydroxylamine hydrochloride in about 100 ml. of ether was added 14.2 ml. of water and 19.3 g. of potassium carbonate. To this mixture, 33.7 g. of 3,4-dihydro-2,2-dimethyl-2H-1-benzopyranyl-8 chloroformate was added dropwise with stirring. The mixture was stirred at room temperature for about 16 hours, and 15 ml. of water was then added. The organic layer was separated from the aqueous solution dried over anhydrous magnesium sulfate, filtered and evaporated in vacuo to yield a residual oil that crystallized upon treatment with hexane. The product, 3,4-dihydro - 2,2 - dimethyl - 2H - 1 - benzofuranyl-8 (hydroxy)(methyl)carbamate, was recrystallized from a hexane-benzene (3:1) solvent; M.P. 89–90°.

Analysis.—Calc'd for $C_{13}H_{17}NO_4$ (percent): C, 62.13; H, 6.82; N, 5.58. Found (percent): C, 61.89; H, 6.86; N, 5.53.

Nematode control was measured as follows: A nematode-infested soil was prepared by mixing about 1,000 larvae of the root-knot nematode (Meloidogyne incognita) into one liter of sandy-loam soil. Into this infested soil was blended 3,4-dihydro-2,2-dimethyl-2H-1-benzopyranyl-8 (hydroxy)(methyl)carbamate, formulated as a 5% dust on attapulgite clay. These mixtures were held in the greenhouse under moist conditions for four days. Then young tomato plants were planted in the soil and allowed to grow for three or four weeks. At the end of this time, the roots of the tomato plants were freed of soil and the degree of infestation was evaluated in comparison with a plant grown in nematode-infested soil which had received no chemical treatment. Results shown in Table 1 represent a minimum of two replicates.

Ovicidal activity was measured by starting with initial infestations predominantly in the form of eggs. A volume of soil equivalent to that normally containing 1,000 larvae was used to replace the larvae inoculation; the tests were otherwise carried out as above.

TABLE 1.—NEMATOCIDAL ACTIVITY OF 3,4-DIHYDRO-2,2-DIMETHYL-2H-1-BENZOPYRANYL-8 (HYDROXY)(METHYL) CARBAMATE

| Concentration, p.p.m. | Root-Knot Index* | |
|---|---|---|
| | Larvae | Eggs |
| 25 | 0 | |
| 10 | 0.1 | 1 |
| 0 (control) | 4 | 4 |

*Root-Knot Index: 4-severe knotting, equivalent to untreated plants; 3=Heavy knotting, but less than untreated plants; 2=Moderate knotting; 1=Slight knotting; 0=No knotting, complete control; (=1)Occasional knots.

Example 2

3,4 - dihydro - 2,2 - dimethyl - 2H - 1 - benzopyranyl-8 (chloroacetyl)(methyl)carbamate was prepared as follows: The starting material, 3,4-dihydro - 2,2 - dimethyl-2H - 1 - benzopyranyl-8 methylcarbamate was prepared as described in Belgian Pat. 683,813 of common ownership herewith. A mixture of 12.5 g. of this material and 23.5 g. chloroacetyl chloride in 25 ml. xylene was heated at 125° for three hours. The reaction mixture was cooled to 70-80°, purged of hydrogen chloride by bubbling nitrogen through the solution, and distilled in vacuo. That fraction distilling at 147-149°/0.01-0.02 mm. Hg was redistilled. Upon redistillation, the fraction boiling at 139-148°/0.01-0.03 mm. Hg solidified upon addition of pentane. This solid was recrystallized from a hexane-pentane mixture to give 3,4-dihydro - 2,2 - dimethyl - 2H-1-benzopyranyl-8 (chloroacetyl)(methyl)carbamate, M.P. 62.5-63.5°.

*Analysis.*—Calc'd for $C_{15}H_{18}NO_4Cl$ (percent): C, 57.59; H, 5.82; N, 4.49; Cl, 11.37. Found (percent): C, 58.01; H, 5.60; N, 4.72; Cl, 10.91.

Nematocidal activity of this compound was measured using the procedure outlined in Example 1. Results are presented in Table 2.

TABLE 2.—NEMATOCIDAL ACTIVITY OF 3,4-DIHYDRO-2,2-DIMETHYL-2H-1-BENZOPYRANYL-8 (CHLOROACETYL) (METHYL) CARBAMATE

| Concentration, p.p.m. | Root-Knot Index* | |
|---|---|---|
| | Larvae | Eggs |
| 25 | 0 | 0 |
| 10 | 0 | −1 |
| 0 (control) | 4 | 4 |

*See Table 1 for footnote.

In addition to the exceptional nematocidal activity exhibited by these compounds, even at the extremely low concentrations shown in Tables 1 and 2, the compounds of this invention also show systemic nematocidal activity by foliar application. They have the added advantage of being toxic to insects.

The compounds of this invention are toxic to a variety of nematodes, such as nematodes of the genus Pratylenchus spp. (root lesion nematodes), Tylenchorhynchus spp., Ditylenchus spp. (bulb nematodes), and Radopholus spp.

These novel compounds may be prepared by a variety of known procedures. For example, they may be prepared by reacting the desired 3,4-dihydrobenzopyranyl chloroformate, derived from the corresponding 8-chromanol, with the appropriately substituted hydroxylamine; or by reacting the appropriate 3,4-dihydrobenzopyranyl N-alkyl-carbamate with acylating agents, such as the chloroacetyl halides, chloroacetyl anhydride, and the like; to give the desired N-hydroxy or N-chloroacetyl carbamate. The chloroformates may also be reacted with an alkali metal salt of a mono-N-alkyl chloroacetamide to give the desired dihydrobenzopyranyl N - chloroacetyl - N - alkyl carbamate. In addition, the dihydrobenzopyranols may be condensed with chloroacetyl isocyanate to yield the corresponding dihydrobenzopyranyl N - chloroacetyl carbamate, which may be subsequently alkylated in the usual manner to give the desired 3,4 - dihydro - 2H - 1 - benzopyranyl N - chloroacetyl - N - alkyl carbamate. The intermediate N - alkyl - carbamates, and the intermediate 8-chromanols, may be prepared as described in copending application Ser. No. 556,259, now U.S. Pat. No. 3,468,913.

The novel compounds thus obtained may be formulated with the usual additives and extenders used in the preparation of nematocidal compositions. The toxicants of this invention, like most pesticidal agents, are generally not applied full strength. They are generally incorporated with the adjuvants and carriers normally employed for facilitating the dispersion of active ingredients, recognizing the accepted fact that the formulation and mode of application of a toxicant may affect the activity of the material. These compounds may be applied, for example, as sprays, dusts, or granules, to the area in which nematode control is desired, the choice of application varying of course with the type of nematode and the environment. Thus, these compounds may be formulated as granules of large particle size, as powdery dusts, as wettable powders, as emulsifiable concentrates, as solutions, and the like.

Dusts are admixtures of the active ingredients with finely divided solids such as talc, attalpulgite clay, kieselguhr, pyrophyllite, chalk, diatomaceous earths, calcium phosphates, calcium and magnesium carbonates, sulfur, lime, flours, and other organic and inorganic solids which act as dispersants and carriers for the toxicant. These finely divided solids have an average particle size of less than about 50 microns. A typical dust formulation useful herein contains 10.0 parts of toxicant, 30.0 parts of bentonite clay and 60.0 parts of talc.

The compounds may be made into liquid concentrates by solution or emulsion in suitable liquids, and into solid concentrates by admixture with talc, clays and other known solid carriers used in the pesticide art. The concentrates are compositions containing about 5–50% toxicant, and the rest inert material which includes dispersing agents, emulsifying agents, and wetting agents. The concentrates are diluted for practical application, with water or other liquid for aqueous sprays or with additional solid carrier for use as dusts. Typical carriers for solid concentrates (also called wettable powders) include fuller's earth, kaolin clays, silicas, and other highly absorbent, readily wet inorganic diluents. A useful solid concentrate formulation for use herein contains 25.0 parts of toxicant, 72.0 parts of bentonite clay and 1.5 parts each of sodium lignosulfonate and sodium laurylsulfonate as wetting agents.

Useful liquid concentrates include the emulsifiable concentrates, which are homogeneous liquid or paste compositions which are readily dispersed in water or other dispersant, and may consist entirely of the toxicant with a liquid or solid emulsifying agent, or may also contain a liquid carrier such as xylene, heavy aromatic naphthas, isophorone and other non-volatile organic solvents. For application these concentrates are dispersed in water or other liquid carrier, and normally applied as a spray to the area to be treated.

Typical wetting, dispersing or emulsifying agents used in pesticidal formulations include, for example, the alkyl and alkylaryl sulfonates and sulfates and their sodium salts; alkylamide sulfonates, including fatty methyl taurides; alkylaryl polyether alcohols, sulfated higher alcohols, polyvinyl alcohols; polyethylene oxides; sulfonated animal and vegetable oils; sulfonated petroleum oils; fatty acid esters of polyhydric alcohols and the ethylene oxide addition products of such esters; and the addition products of long chain mercaptans and ethylene oxide. Many other types of useful surface active agents are available in commerce. The surface active agent, when used, normally comprises from 1 percent to 15 percent by weight of the pesticidal composition.

Other useful formulations include simple solutions of the active ingredient in a dispersant in which it is completely soluble at the desired concentration, such as acetone or other organic solvents. Granular formulations, wherein the toxicant is carried on relatively course particles, are of particular utility in nematocidal applications.

The concentration of the toxicant in the dilution generally used for control of nematodes is normally in the range of about 2% to about 0.001%. Many variations of spraying and dusting compositions in the art may be used, by substituting the compounds of this invention into compositions known or apparent to the art.

The presticidal compositions may be formulated and applied with other active ingredients, including other nematocides, insecticides, fungicides, plant growth regulators, fertilizers, etc. In applying the chemicals it is obvious that an effective amount and concentration of toxicant should be employed.

It is apparent that many modifications may be made in the structure, preparation, formulation and application of the compounds of this invention, without departing from the spirit and scope of the following claims:

We claim:
1. A compound of the formula:

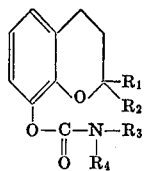

wherein $R_1$ and $R_2$ may each be hydrogen or methyl, $R_3$ is hydroxy or chloroacetyl, and $R_4$ is a lower alkyl group.

2. The compound 3,4-dihydro-2,3-dimethyl - 2H - 1-benzopyranyl-8 (chloroacetyl)(methyl)carbamate.

3. The compound 3,4-dihydro-2,2-dimenthyl - 2H - 1-benzopyranyl-8 (hydroxy)(methyl)carbamate.

References Cited

UNITED STATES PATENTS 3,468,913  9/1969  Scharpf _____ 260—345.2

HENRY R. JILES, Primary Examiner

J. M. FORD, Assistant Examiner

U.S. Cl. X.R.

424—283